US012796591B2

(12) United States Patent
(10) Patent No.: US 12,796,591 B2
(45) Date of Patent: Nov. 17, 2026

Lewis et al.

(54) AUTOMATIC ELECTRIC CUTTING SPEED CONTROL FOR MOWER

(71) Applicant: DEERE & COMPANY, Moline, IL (US)

(72) Inventors: Timothy J. Lewis, Angier, NC (US); Carl B. Agee, Garner, NC (US); Brad A. Hoffman, Angier, NC (US); Daniel B. Thiemke, Holly Springs, NC (US); David J. Gordon, Fuquay Varina, NC (US)

(73) Assignee: DEERE & COMPANY, Moline, IL (US)

( * ) Notice: Subject to any disclaimer, the term of this patent is extended or adjusted under 35 U.S.C. 154(b) by 317 days.

(21) Appl. No.: 18/606,070

(22) Filed: Mar. 15, 2024

(65) Prior Publication Data

US 2025/0287868 A1 Sep. 18, 2025

(51) Int. Cl.
*A01D 34/00* (2006.01)
*A01D 34/78* (2006.01)
*A01D 101/00* (2006.01)

(52) U.S. Cl.
CPC ........... *A01D 34/006* (2013.01); *A01D 34/78* (2013.01); *A01D 2101/00* (2013.01)

(58) Field of Classification Search
CPC .............................. A01D 34/006; A01D 34/78
See application file for complete search history.

(56) References Cited

U.S. PATENT DOCUMENTS

| | | | | |
|---|---|---|---|---|
| 7,954,308 | B2 | 6/2011 | Harris | |
| 9,635,806 | B2 | 5/2017 | Waitt et al. | |
| 11,241,958 | B2 | 2/2022 | Fohrenkamm et al. | |
| 2012/0227369 | A1* | 9/2012 | Koike | B60L 1/003 318/474 |
| 2013/0104509 | A1 | 5/2013 | Mackinnon et al. | |
| 2017/0215337 | A1 | 8/2017 | Doughty | |
| 2019/0075724 | A1* | 3/2019 | Becke | A01D 34/008 |

(Continued)

FOREIGN PATENT DOCUMENTS

| | | | |
|---|---|---|---|
| EP | 3536461 | A1 | 9/2019 |
| EP | 3273767 | B1 | 12/2019 |

(Continued)

OTHER PUBLICATIONS

WO-2023246372-A1 Translation (Year: 2026).*

(Continued)

*Primary Examiner* — Giovanna Wright

(57) ABSTRACT

An automatic rotary cutting speed control system for a mower. The rotary cutting speed control system includes a mower deck including an electric motor configured to drive a rotatable blade carrier supporting at least one blade for cutting grass. The system also includes a controller operatively coupled with the electric motor. The controller includes a processor, a memory device operatively coupled with the processor, and cutting speed control logic stored in the memory device and being executable by way of the processor to control rotation of the blade carrier by: (i) receiving a signal representative of a measurement of blade carrier rotation including rotary speed or torque or both, and (ii) adjusting a target blade carrier drive signal based on the received signal to automatically drive the blade carrier.

18 Claims, 8 Drawing Sheets

(56) References Cited

U.S. PATENT DOCUMENTS

| | | | |
|---|---|---|---|
| 2019/0255944 | A1 | 8/2019 | Fohrenkamm et al. |
| 2020/0128727 | A1 | 4/2020 | Jager et al. |
| 2020/0260644 | A1 | 8/2020 | Ichikawa |
| 2021/0094420 | A1 | 4/2021 | Sosnowski et al. |
| 2021/0195834 | A1 | 7/2021 | Arendt et al. |
| 2022/0194227 | A1 | 6/2022 | Fohrenkamm et al. |
| 2022/0272898 | A1* | 9/2022 | Larsén ...................... B25F 3/00 |
| 2024/0107949 | A1* | 4/2024 | Clapp .................... A01D 34/78 |
| 2024/0313690 | A1* | 9/2024 | Bachman ............. A01D 75/182 |
| 2025/0070702 | A1* | 2/2025 | Lu ........................... H02P 21/16 |
| 2025/0112518 | A1* | 4/2025 | Bonny ................... A01D 69/02 |

FOREIGN PATENT DOCUMENTS

| | | | | |
|---|---|---|---|---|
| EP | 3831539 | A1 | 6/2021 | |
| EP | 4292418 | A1 | 12/2023 | |
| WO | WO 2016109860 | A2 | 7/2016 | |
| WO | WO 2023132833 | A1 | 7/2023 | |
| WO | WO-2023246372 | A1 * | 12/2023 | ............. A01D 34/78 |

OTHER PUBLICATIONS

STIHL RMA 460V Instruction Manual, pp. 1-88.

STIHL RMA 460V, pp. 1-7, [online]. Retrieved from the Internet <URL: https://www.stihlusa.com/products/lawn-mowers/push-mowers/rma460v/#features>.

Extended European Search Report and Written Opinion issued in European Patent Application No. 25161831.0 dated Jul. 28, 2025, in 09 pages.

Extended European Search Report and Written Opinion issued in European Patent Application No. 25161720.5 dated Jul. 28, 2025, in 10 pages.

* cited by examiner

AUTOMATIC ELECTRIC CUTTING SPEED CONTROL FOR MOWER

FIELD OF DISCLOSURE

The present disclosure relates to an electric mower and to a control system therefor.

BACKGROUND

Electric mowers may include a cutting speed selector allowing an operator to select a desired cutting speed.

SUMMARY

A selected cutting speed that is too low may provide poor cut quality. A selected cutting speed that is too high may deplete the battery unnecessarily without providing substantial additional cutting benefits beyond a preferred cutting speed. The preferred cutting speed balances cut quality with energy consumption. The preferred cutting speed may change as grass conditions change from one area to another, and it may be difficult for an operator to keep up with the changes. It may also be difficult for an operator to know which speed is preferred for a given condition. As such, there is a need for automatic cutting speed adjustment.

In one aspect, the disclosure provides an automatic rotary cutting speed control system for a mower. The rotary cutting speed control system includes a mower deck including an electric motor configured to drive a rotatable blade carrier supporting at least one blade for cutting grass. The system also includes a controller operatively coupled with the electric motor. The controller includes a processor, a memory device operatively coupled with the processor, and cutting speed control logic stored in the memory device and being executable by way of the processor to control rotation of the blade carrier by: (i) receiving a signal representative of a measurement of blade carrier rotation including rotary speed or torque or both, and (ii) adjusting a target blade carrier drive signal based on the received signal to automatically drive the blade carrier.

In another aspect, the disclosure provides an automatic rotary cutting speed control system for a mower. The automatic cutting speed control system includes a mower deck including an electric motor configured to drive a rotatable blade carrier supporting at least one blade for cutting grass. The motor is drivable by a target blade carrier drive signal. The system also includes a controller operatively coupled with the electric motor. The controller includes a processor, a memory device operatively coupled with the processor, and cutting speed control logic stored in the memory device and being executable by way of the processor to control rotation of the blade carrier by: (i) calculating a load ratio representative of grass load, and (ii) automatically adjusting the target blade carrier drive signal based on the load ratio.

In yet another aspect, the disclosure provides an automatic blade detection system for a mower with electrically driven deck. The automatic blade detection system includes a mower deck including an electric motor configured to drive a rotatable blade carrier supporting at least one first blade for cutting grass. The at least one first blade is interchangeable with at least one second blade for cutting grass. The at least one first blade is a different type of blade than the at least one second blade. The system also includes a controller operatively coupled with the electric motor. The controller includes a processor, a memory device operatively coupled with the processor, and blade detection logic stored in the memory device and being executable by way of the processor to: measure a blade carrier feedback signal, identify the type of blade based on the blade carrier feedback signal, and control a mower operation based at least in part on the identified type of blade.

Other aspects of the disclosure will become apparent by consideration of the detailed description and accompanying drawings.

DETAILED DESCRIPTION

Figure 1:
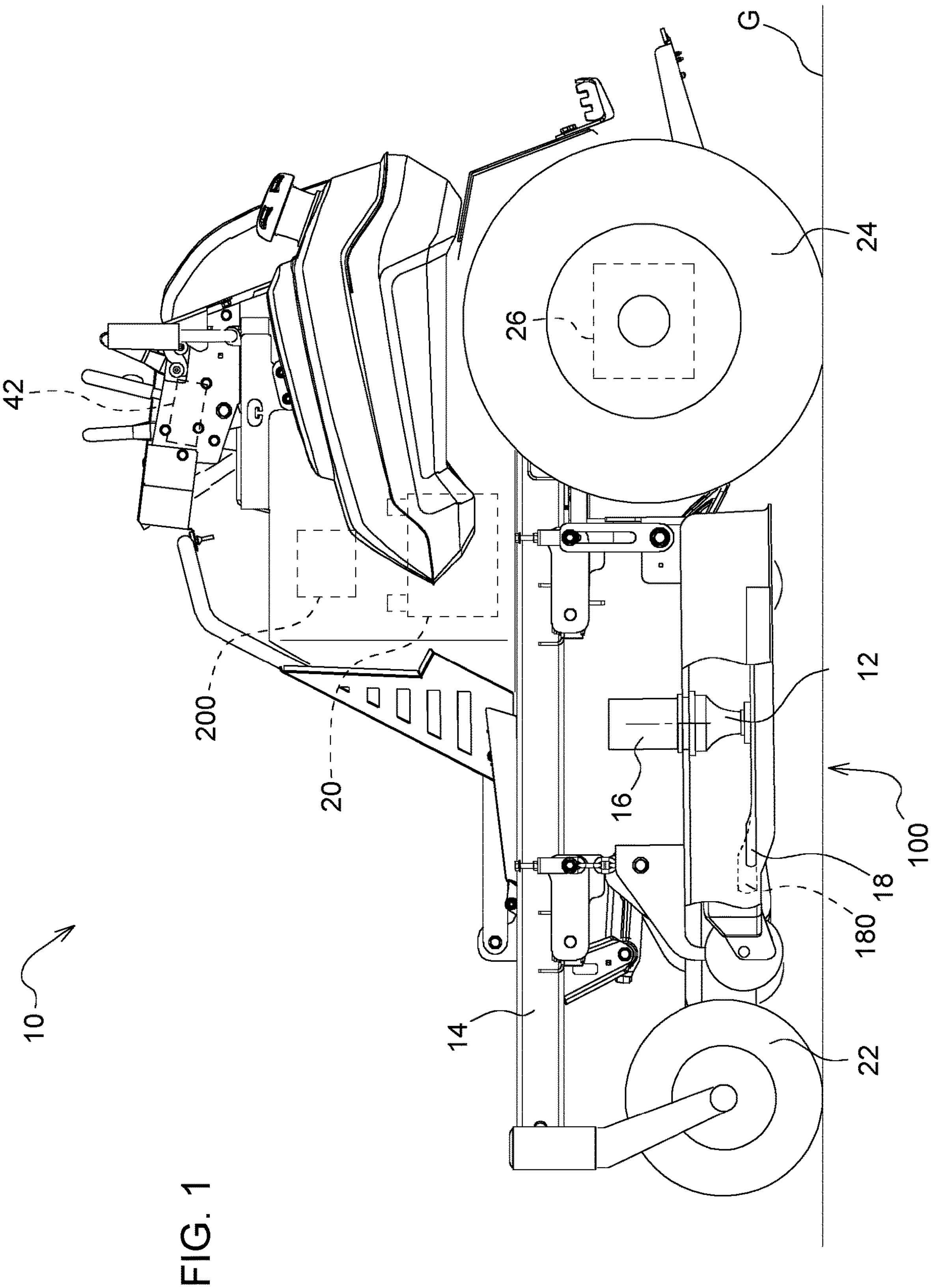
FIG. 1 is a side view of an electric mower having a cutting speed control system and at least one battery-powered rotary cutting blade in accordance with one implementation of the present disclosure.

Before any constructions of the disclosure are explained in detail, it is to be understood that the disclosure is not limited in its application to the details of construction and the arrangement of components set forth in the following description or illustrated in the accompanying drawings. The disclosure is capable of supporting other constructions and of being practiced or of being carried out in various ways.

Typically, electric mowers may include a cutting speed selector allowing an operator to select a desired cutting speed during use. A selected cutting speed that is too low may provide poor cut quality. A selected cutting speed that is too high may deplete the battery unnecessarily without providing substantial additional cutting benefits beyond a preferred cutting speed. The preferred cutting speed balances cut quality with energy consumption. The preferred cutting speed may change as grass conditions change from one area to another, and it may be difficult for an operator to keep up with the changes. It may also be difficult for an operator to know which speed is preferred for a given condition. As such, there is a need for automatic cutting speed adjustment.

In accordance with the disclosure, a mower with automatic target cutting speed adjustment is provided. The target cutting speed adjustment may be continuously and automatically executed in a closed loop based on a value representative of instantaneous grass load.

The target cutting speed adjustment may be used with any type of mower. Examples of mower types disclosed herein are not limiting. The mower may include a mower deck including an electric motor configured to drive a rotatable blade carrier supporting at least one blade for cutting grass.

The at least one blade is configured to rotate with the blade carrier. The electric motor may be powered by a battery. The electric motor may be driven by a target blade carrier drive signal. The target blade carrier drive signal is an automatic control signal from a controller that drives rotation of the blade carrier via the motor. Thus, the controller may be operatively coupled with the electric motor. The blade carrier may include any suitable type of rotatable blade carrier, such as a spindle, a reel, etc., or may refer to an intermediate part to which the blade(s) is/are attached and which is ultimately driven by the spindle, the reel, etc., or to any combination thereof. Cutting speed may be defined by a rotary spindle speed, a rotary reel speed, a speed of any other blade carrier, or by the rotary speed of the blade(s) itself.

The controller may include a processor and a memory device operatively coupled with the processor. The controller includes automatic cutting speed control logic stored in the memory device and being executable by way of the processor. The cutting speed control logic automatically drives rotation of the blade carrier, making it unnecessary for the operator to input manual control signals. However, it may be possible to provide an actuator(s) allowing the operator to override the automatic cutting speed control logic and manually set a desired cutting speed temporarily. The automatic cutting speed control logic may use one or more inputs to determine a target blade carrier drive signal for the condition and adapts continuously. The target blade carrier drive signal represents a commanded speed or torque at which the blade carrier is desired to be driven. The controller may then drive the actual speed or torque of the blade carrier towards the target blade carrier drive signal (speed or torque), e.g., using a closed feedback loop based on the actual speed or torque. This portion of the functionality (i.e., driving the actual speed or torque towards the target speed or torque) may be carried out by the same controller that has the automatic cutting speed control logic or by a separate controller in communication therewith.

Optionally, the target blade carrier drive signal may include, or be initially set to, a nominal target blade carrier drive signal that is based, at least in part, on a ground speed of the mower. The ground speed may be measured or commanded. As one example, the nominal target blade carrier drive signal may be based on the minimum (but only in the forward direction) desired ground speed between the left and right wheels. The cutting speed control logic may change the cutting speed between a range according to the ground speed and sets the "nominal" cutting speed.

Additionally or alternatively, it is possible that the target blade carrier drive signal may be based, at least in part, on a measurement of blade carrier rotation. For example, the target blade carrier drive signal may be based, at least in part, on a measured blade carrier torque, a measured blade carrier rotary speed, or both, or another value that is representative of measured blade carrier speed or torque such as current, voltage, back-EMF, etc. The measured blade carrier torque and measured blade carrier rotary speed may be derived in many different ways, some of which are described herein below.

More specifically, the target blade carrier drive signal may additionally or alternatively be based, at least in part, on a load ratio. The load ratio may be representative of grass load. The load ratio may be based at least in part on the measurement of blade carrier rotation, which may be in the numerator or denominator. The load ratio may be based on a comparison between the measurement of blade carrier rotation and one other value. The one other value may be selected from the group including, but not limited to: a different measurement of blade carrier rotation (e.g., the other of torque or speed, or another value that is representative of measured blade carrier speed or torque such as current, voltage, back-EMF), a commanded blade carrier speed, a commanded blade carrier torque, etc. The measured torque and speed values may be derived from current, voltage, back-EMF, sensors, etc. (as may be described in greater detail below). If the mower includes multiple blade carriers, an average value may be used in the ratio. As one example, the load ratio may be calculated based on the average measured torque on the blade carrier(s) and the commanded cutting speed. This example creates a load ratio of Newton-meters/revolutions-per-minute (Nm/rpm) to provide a better representation of the grass load at any given moment than looking at a single value (though using a single value representative of grass load may still be useful and is contemplated herein). Other values may also be used to calculate the load ratio, as may be described in greater detail herein.

The logic may compare the instantaneous measured load ratio to a target load ratio value stored in the memory device. The logic may drive the instantaneous measured load ratio towards the target load ratio value. In doing so, the logic is automatically changing a target cutting speed of the blade carrier. For example, the lower the measured load ratio is compared to the target load ratio value, the further the logic reduces the cutting speed; the higher the measured load ratio is above the target load ratio value the further the logic increases cutting speed. This results in a logic that greatly simplifies the operator interface by automating the decision process an operator would need to go through to determine how to set the correct rotary cutting speed, compared to a manual speed-setting process. It also is continuously optimizing the cutting speed to use less power while delivering the cut quality that is needed. This simplifies the interface and extends the run time of the mower.

The operator may be able to install a variety of different types of blades on the mower depending on their preference. Optionally, the logic settings above may change depending on the blade that is installed. For example, the target load ratio may be selected by the logic based on the type of blade that is installed. Different target load ratios may be stored in the memory device, each corresponding to a different type of blade identified. The target load ratios may be determined experimentally or theoretically.

Automatic blade detection logic may be provided to allow the mower to automatically detect the type of blade (low, medium, or high lift for example) then automatically choose the correct control settings for that blade type. The automatic blade detection logic may be used with the cutting speed control logic described herein or may be an independent feature from the cutting speed control logic described herein, as the blade detection logic may have other useful applications. In one example, one of the target load ratios may be selected based on the type of blade detected.

The blade detection logic may detect different types of blades by measuring a blade carrier feedback signal. The measurement may be a single point, multiple points of measurement, a measurement(s) over time, or any combination thereof. The measurement(s) may occur during startup of the mower or after startup. As one example, the blade carrier feedback signal may be measured and recorded during startup from rest at least until the blade carrier stabilizes. The blade detection logic may identify the type of blade based on the feedback signal. The memory device may include a plurality of blade type categories stored therein.

Identifying the blade type may include sorting the blade carrier feedback signal into one of the plurality of blade type categories stored in the memory device. For example, the blade type categories may be based on blade lift and/or blade length. In a more specific example, the categories may include low lift, medium lift, and high lift. Different types of blades may be characterized by one or more of: a different blade length, a different blade mass, a different blade density, any combination thereof, or any other characteristic or combination of characteristics that differentiates one type of blade from a different type of blade. Such characteristics affect the appearance and/or value of the blade carrier feedback signal during startup. Thus, the blade carrier feedback signal provides a measure of blade type that is categorizable into the predetermined categories of blade types.

As one example, the feedback signal may include blade carrier torque. In this example, the blade detection logic may be configured to apply a constant predetermined speed signal to drive rotation of the blade carrier from rest during startup, at least until the blade carrier rotation stabilizes (i.e., reaches steady state). Based on a characteristic of the blade carrier torque measurement during startup, the blade detection logic determines what type of blade is being used with the mower. For example, the characteristic may include a shape of the torque curve recorded over time, and/or a value such as (but not limited to) the steady state torque that is reached when the constant predetermined speed is applied, and/or the value(s) of the torque at any other certain point or points in time during startup, and/or a torque difference between two points on the torque curve, any combination thereof, etc. Other feedback signals and characteristics thereof are possible, in any combination.

As another example, the feedback signal may include blade carrier speed. In this example, the blade detection logic may be configured to apply a constant predetermined torque signal to drive rotation of the blade carrier from rest during startup, at least until the blade carrier rotation stabilizes (i.e., reaches steady state). Based on a characteristic of the blade carrier speed measurement during startup, the blade detection logic determines what type of blade is being used with the mower. For example, the characteristic may include a shape of the speed curve recorded over time, and/or a value such as the steady state speed that is reached when the constant predetermined torque is applied, and/or the value(s) of the speed at any other certain point or points in time during startup, and/or a speed difference between two points on the speed curve, any combination thereof, etc. Other feedback signals and characteristics thereof are possible, in any combination.

Figure 2:
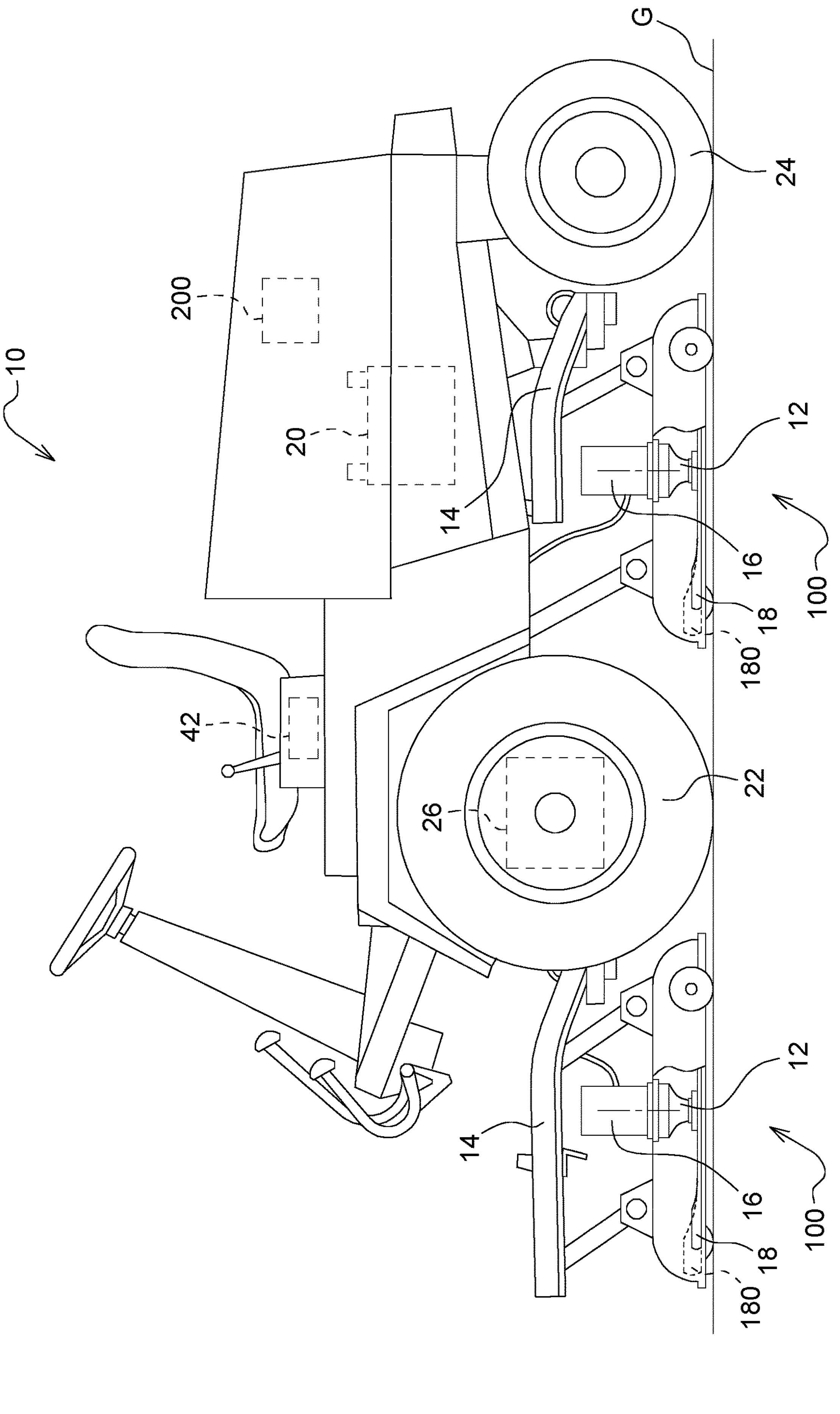
FIG. 2 is a side view of another type of electric mower having the cutting speed control system and at least one battery-powered rotary cutting blade in accordance with another implementation of the present disclosure.
Figure 3:
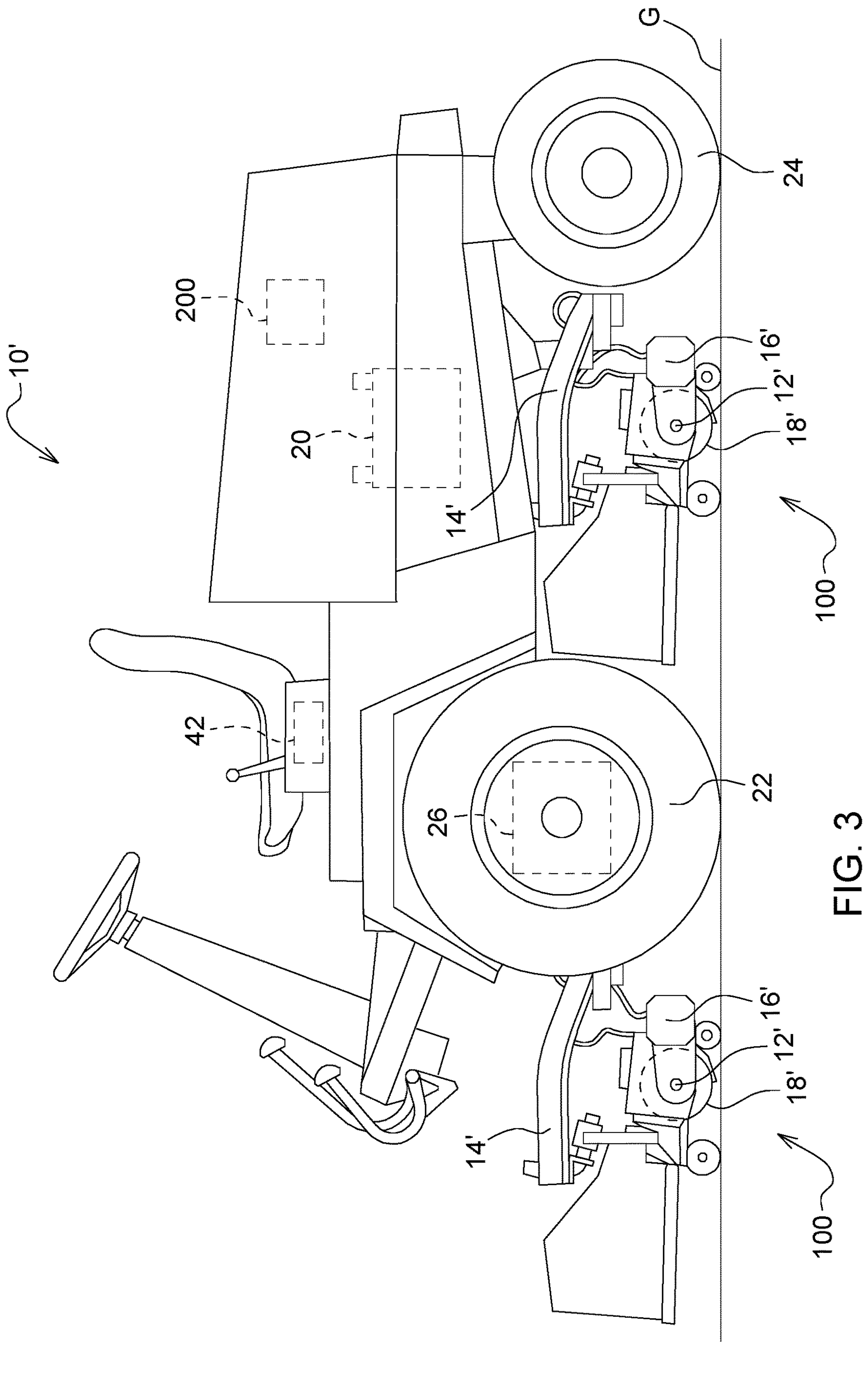
FIG. 3 is a side view of an electric mower having the cutting speed control system and at least one battery-powered reel in accordance with another implementation of the present disclosure.

FIGS. 1-3 illustrate a mower 10, 10' with automatic cutting speed adjustment. FIG. 1 illustrates a stand-up style mower, while FIGS. 2-3 illustrate a ride-on style mower. The mower 10 illustrated in FIGS. 1 and 2 is effectively the same with respect to the functional parts discussed herein except for the different style being illustrated in the line drawings. FIGS. 2 and 3 differ in the type of blade carrier 12, 12' used on the deck 14, 14' (FIG. 1 illustrates a spindle with rotary blades and FIG. 2 illustrates a reel), but all types of mowers can employ the control logic described herein. As such, it should be understood that any description of the mower 10 of FIGS. 1-2 herein also applies to the mower 10' of FIG. 3 except the axis of rotation of the cutting blades is oriented differently. Like parts of the deck 14' are labeled with the same reference numerals as the deck 14 plus “'”, and the rest of the mower 10' is the same as the mower 10 and therefore labeled using the same reference numerals. As such, the mower 10' need not be described separately and reference is made to the description of the mower 10 herein. Any of the mowers 10, 10' disclosed herein may optionally be zero turn radius mowers.

The mower 10 may include a mower deck 14 including an electric motor 16 configured to drive a rotatable blade carrier 12 supporting at least one blade 18 for cutting grass. The at least one blade 18 is configured to rotate with the blade carrier 12. The at least one blade may be interchangeable with at least one different type of blade 180 (FIGS. 1 and 2). The operator may select the type of blade desired and install the selected type for certain applications. Different types of blades may be characterized by different length, lift, density, mass, etc. For example, different blade type categories may include low lift, medium lift, and high lift. The electric motor 16 may be powered by at least one battery 20. The blade carrier 12 may include any type of rotatable blade carrier, such as a spindle (as illustrated in FIGS. 1-2 and labeled 12), a reel (as illustrated in FIG. 3 and labeled 12'), etc. The term “blade carrier” may additionally or alternatively refer to an intermediate part to which the blade(s) is/are attached and which is ultimately driven by the spindle, the reel, etc., or more generally by the electric motor 16, or to any combination thereof.

The mower 10 may also include front wheels 22, rear wheels 24, and a traction drive motor 26 configured to drive the front wheels 22 and/or the rear wheels 24 to move the mower 10 over the ground G at a ground speed. The traction drive motor 26 may be an electric motor powered by the at least one battery 20, or by a different battery or batteries (not shown). The traction drive motor 26 may alternatively include an internal combustion engine, or any other suitable type of prime mover.

With reference to FIGS. 1-4, the mower 10 also includes a human-machine interface (HMI) 42 (e.g., including a display and input members, such as any combination of one or more of buttons, dials, joysticks, mouse pads, a touch screen, a graphical user interface, or the like) with which the operator can input settings, preferences, commands, etc. to control various aspects of the mower 10. The operator inputs are communicated to a controller 200 by wired or wireless signals.

The mower 10 may include a cutting speed control system 100 to drive the speed and/or torque of the blade carrier 12 (either of which effectively controls the cutting speed). The cutting speed control system 100 may include a controller (such as the controller 200 which is described in greater detail herein or another suitable controller), the blade carrier 12, and the electric motor 16. The blade carrier 12 is driven in rotation by the electric motor 16, which is controlled by a blade carrier drive signal 224. The blade carrier drive signal 224 is an automatic control signal from the controller 200 that drives rotation of the blade carrier 12 via the electric motor 16. Thus, the controller 200 may be operatively coupled with the electric motor 16.

Figure 4:
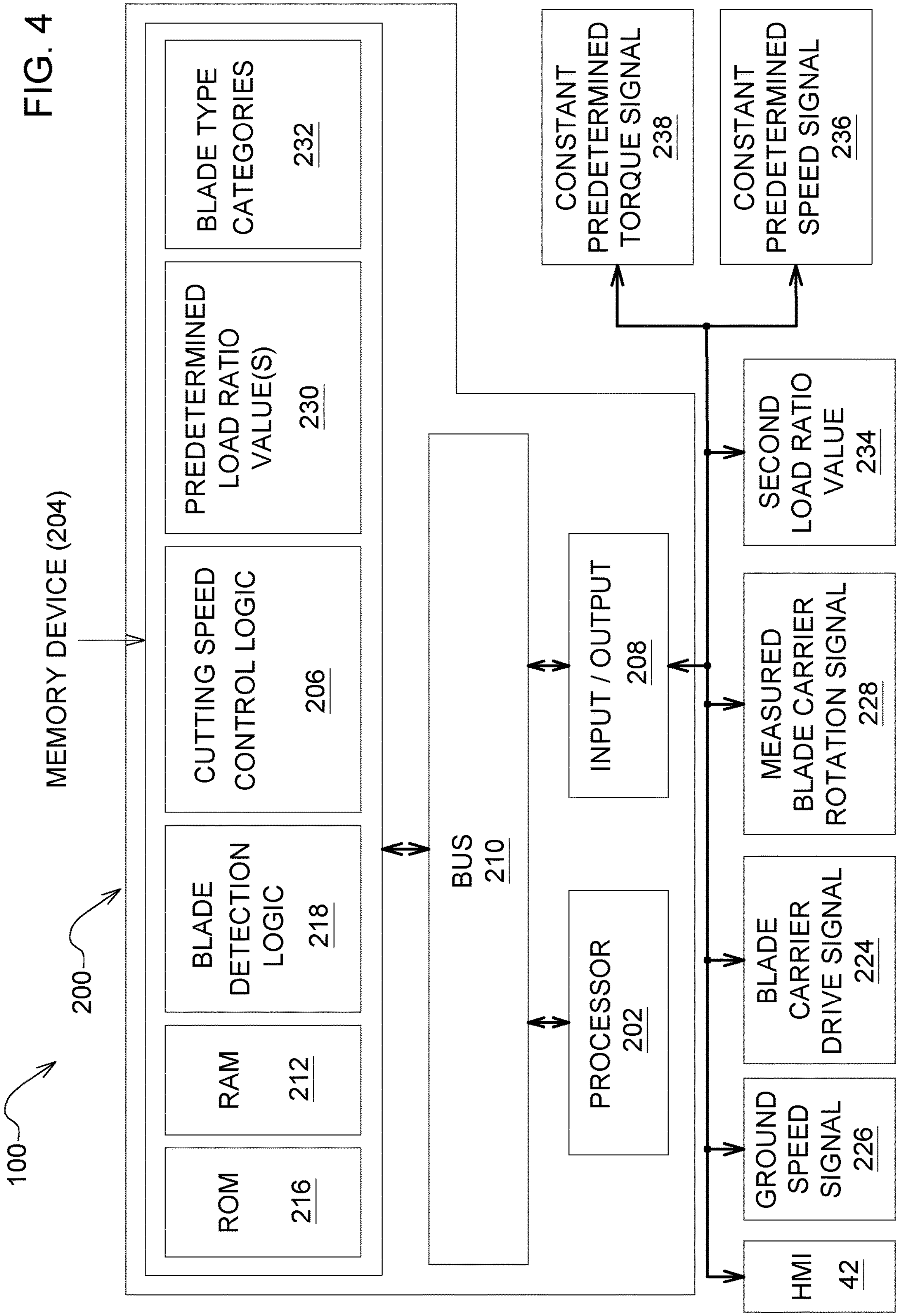
FIG. 4 is a block diagram of a controller associated with the mowers of FIGS. 1-3.

With reference to FIG. 4, operation of the blade carrier rotation may be controllable via the controller 200. The controller 200 may include a bus 210 or other communication mechanism for communicating information and a processor 202 coupled with the bus 210 for processing information. The controller 200 includes a main memory 204 (which may also be referred to herein as a memory device 204), which may comprise random access memory (RAM) 212 or other dynamic storage devices for storing information and instructions such as cutting speed control logic 206 to be executed by the processor 202, and/or read only memory (ROM) 216 or other static storage device for storing static information and instructions for the processor 202. The main memory 204 may be a non-transitory, non-volatile memory device and operable to store information and instructions executable by the processor 202. The controller 200 may also include an input/output 208 for receiving input signals from the HMI 42 and providing output control signals, such as the blade carrier drive signal 224. The term "controller" as used herein may encompass a single controller or a group of controllers in communication with each other.

The controller 200, via the cutting speed control logic 206, may be configured to automatically control the cutting speed of the blade carrier 12. In other words, instead of a human operator inputting a target cutting speed, the controller 200 is configured to automatically set the target cutting speed and to continuously adjust the target cutting speed based on changing load conditions. The cutting speed control logic 206 is stored in the memory device and executable by way of the processor 202 to control the rotation of the blade carrier 12.

As one example, the cutting speed control logic 206 is configured to receive a signal 226 representative of a ground speed of the electric mower. The signal 226 may be representative of a measured or commanded ground speed. Based on the ground speed, the cutting speed control logic 206 may be configured to set the target blade carrier drive signal 224 to a nominal value. The nominal value may be a starting point from which the cutting speed control logic 206 further adjusts the target blade carrier drive signal 224. However, the nominal value need not be set because the cutting speed control logic 206 could adjust the target blade carrier drive signal 224 without it. As such, setting the nominal value based on ground speed is optional.

Additionally or alternatively, the cutting speed control logic 206 may be configured to receive a signal 228 representative of a measurement of blade carrier rotation (see FIG. 5, which is described in greater detail below). The signal 228 may be representative of a measured blade carrier torque and/or a measured blade carrier rotary speed. The measurement of blade carrier rotation may be derived in a number of ways, directly or indirectly. For example, the measurement of blade carrier rotation may be derived from the electric motor 16, the blade carrier 12, the battery 20, or any combination thereof. In one example, the measurement of blade carrier rotation may be derived from the electric motor 16. More specifically, the measurement of blade carrier rotation may be derived from motor current, motor voltage, back-EMF at the motor 16, motor speed, motor torque, etc., or any combination thereof. Even more specifically, as one example, the motor current (required to rotate the electric motor 16 under a grass load) and motor speed may be indicative of blade carrier torque. In another example, the measurement of blade carrier rotation may be derived from the battery 20. More specifically, the measurement of blade carrier rotation may be derived from battery current, battery voltage, etc., or any combination thereof. In another example, the measurement of blade carrier rotation may be derived from the blade carrier 12. More specifically, the measurement of blade carrier rotation may be derived from blade carrier torque, blade carrier speed, back-EMF at the blade carrier, etc., or any combination thereof. Based on the signal 228, the cutting speed control logic 206 may be configured to adjust the target blade carrier drive signal 224. In one example, the blade carrier drive signal 224 is adjusted from the nominal value based on the signal 228. In another example, the cutting speed control logic 206 adjusts the blade carrier drive signal 224 without using the nominal value.

Additionally or alternatively, the cutting speed control logic 206 may be configured to calculate a load ratio (see FIG. 6, which is described in greater detail below). The cutting speed control logic 206 may be further configured to automatically adjust the target blade carrier drive signal 224 based on the load ratio. The adjustment may be continuous. The load ratio is representative of grass load on the blade carrier 12 and may be calculated using various combinations of values. One of those values may include the signal 228 representative of a measurement of blade carrier rotation. The load ratio may be based at least in part on the measurement of blade carrier rotation 228, which may be in the numerator or denominator of the load ratio. The load ratio may be based on a comparison between the measurement of blade carrier rotation 228 and one other value (e.g., a second load ratio value 234 illustrated in FIG. 4). The second load ratio value 234 may be selected from a group including, but not limited to: a different measurement of blade carrier rotation (e.g., the other of torque or speed), a commanded blade carrier speed, a commanded blade carrier torque, etc. If the mower 10 includes multiple blade carriers 12, an average value may be used in the ratio or a representative value may be selected. As one example, the load ratio may be calculated based on the measured torque on the blade carrier(s) 12 and the commanded cutting speed. More specifically, the load ratio may be the measured torque on the blade carrier(s) 12 divided by the commanded cutting speed (or vice versa). This example creates a load ratio of Newton-meters/revolutions-per-minute (Nm/rpm) (or vice versa) to provide a better representation of the grass load at any given moment than looking at a single value. Other values may also be used to calculate the load ratio, as may be described in greater detail herein.

The cutting speed control logic 206 may compare the instantaneous measured load ratio to a target load ratio value 230 stored in the memory device. The cutting speed control logic 206 may adjust the target blade carrier drive signal 224 to drive the instantaneous measured load ratio towards the target load ratio value 230. This may be a closed feedback loop. This may be continuous. For example, if the measured load ratio is lower than the target load ratio value 230, the cutting speed control logic 206 may reduce the cutting speed. If the measured load ratio is higher than the target load ratio value 230, the cutting speed control logic 206 may increase the cutting speed. In some examples, the strength of increasing or decreasing the cutting speed may be proportionate to the magnitude of the difference between the measured load ratio and the target load ratio value 230. For example, the lower the measured load ratio is compared to the target load ratio value, the further the cutting speed control logic 206 reduces the cutting speed. The higher the measured load ratio is above the target load ratio value 230 the further the cutting speed control logic 206 increases cutting speed.

As such, the cutting speed control logic 206 continuously adjusts the target blade carrier drive signal 224 automatically. The controller 200 may then drive the actual speed or torque of the blade carrier towards the target blade carrier drive signal (which is representative of the desired blade carrier speed or torque), e.g., using a closed feedback loop based on the actual speed or torque. This portion of the functionality (i.e., driving the actual speed or torque towards the target speed or torque) may be carried out by the same controller 200 that has the automatic cutting speed control logic 206 or by a separate controller in communication therewith.

The controller 200 may additionally or alternatively be configured to distinguish between different types of blades. The cutting speed control system 100 may additionally or alternatively include blade detection logic 218 configured to identify the type of blade used with the blade carrier 12. The blade detection logic 218 may detect different types of blades by measuring a blade carrier feedback signal. The blade carrier feedback signal may be measured at a point or points in time, or over a period of time, or any combination thereof. As on example, the measurement may occur during startup of the mower. Startup begins when the blade carrier 12 is at rest and the electric motor 16 is activated to initiate rotation of the blade carrier 12. The blade carrier feedback signal may be measured and recorded at least until the blade carrier rotation stabilizes. The blade carrier feedback signal may be derived in any suitable manner. The blade carrier feedback signal may be derived from the signal 228 representative of a measurement of blade carrier rotation described above or from a separate source. As such, the blade carrier feedback signal is illustrated in FIG. 4 as the measured blade carrier rotation signal 228, though the blade carrier feedback signal is more specifically measured from the signal 228 during startup while the signal 228 after startup (during runtime of the mower) is used for automatic cutting speed control. For example, the blade carrier feedback signal may be derived from current, voltage, speed, back-EMF, torque, etc. of the electric motor 16, the blade carrier 12, the battery 20, etc.

The blade detection logic 218 may identify the type of blade based on the blade carrier feedback signal. The memory device 204 may include a plurality of blade type categories 232 stored therein. Identifying the blade type may include sorting the blade carrier feedback signal into one of the plurality of blade type categories 232 stored in the memory device 204. For example, the blade type categories 232 may be based on blade lift and/or blade length. In a more specific example, the categories may include low lift, medium lift, and high lift. Different types of blades may be characterized by one or more of: a different blade length, a different blade mass, a different blade density, any combination thereof, or any other characteristic or combination of characteristics that differentiates one type of blade from a different type of blade. Such characteristics affect the appearance and/or value(s) of the blade carrier feedback signal during startup. Thus, the blade carrier feedback signal provides a measure of blade type that is categorizable into the predetermined categories of blade types. In one example, one of the target load ratio values 230 may be selected based on the type of blade detected. Different target load ratio values 230 may be stored in the memory device 204 for different blade types.

As one example, the blade carrier feedback signal may include blade carrier torque. In this example, the blade detection logic 218 may be configured to apply a constant predetermined speed signal 236 to drive rotation of the blade carrier 12 from rest during startup, at least until the blade carrier rotation stabilizes (i.e., reaches steady state). Based on a characteristic of the blade carrier torque measurement during startup, the blade detection logic 218 determines what type of blade is being used with the mower 10. For example, the characteristic may include a shape of the torque curve recorded over time, and/or a value such as the steady state torque that is reached when the constant predetermined speed 236 is applied, and/or the value(s) of the torque at any other certain point or points in time during startup, and/or a torque difference between two points on the torque curve, any combination thereof, etc.

As another example, the feedback signal may include blade carrier speed. In this example, the blade detection logic 218 may be configured to apply a constant predetermined torque signal 238 to drive rotation of the blade carrier 12 from rest during startup, at least until the blade carrier rotation stabilizes (i.e., reaches steady state). Based on a characteristic of the blade carrier speed measurement during startup, the blade detection logic 218 determines what type of blade is being used with the mower 10. For example, the characteristic may include a shape of the speed curve recorded over time, and/or a value from the speed curve such as the steady state speed that is reached when the constant predetermined torque is applied, and/or the value(s) of the speed at a certain point or points in time during startup, and/or a speed difference between two points on the speed curve, etc. Other feedback signals and characteristics thereof are possible.

Figure 5:
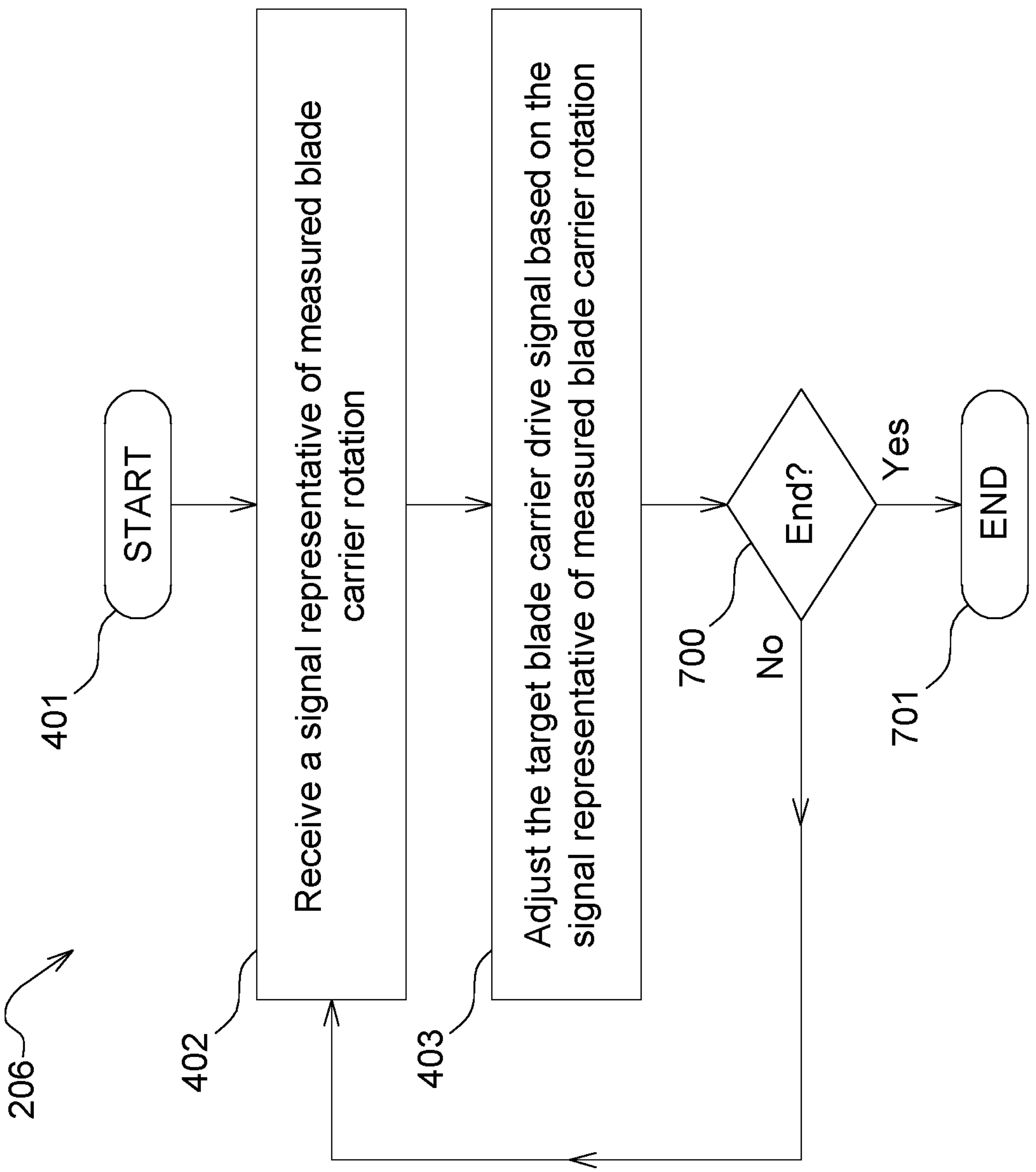
FIG. 5 is a flow chart illustrating cutting speed control logic associated with the mowers of FIGS. 1-3.
Figure 6:
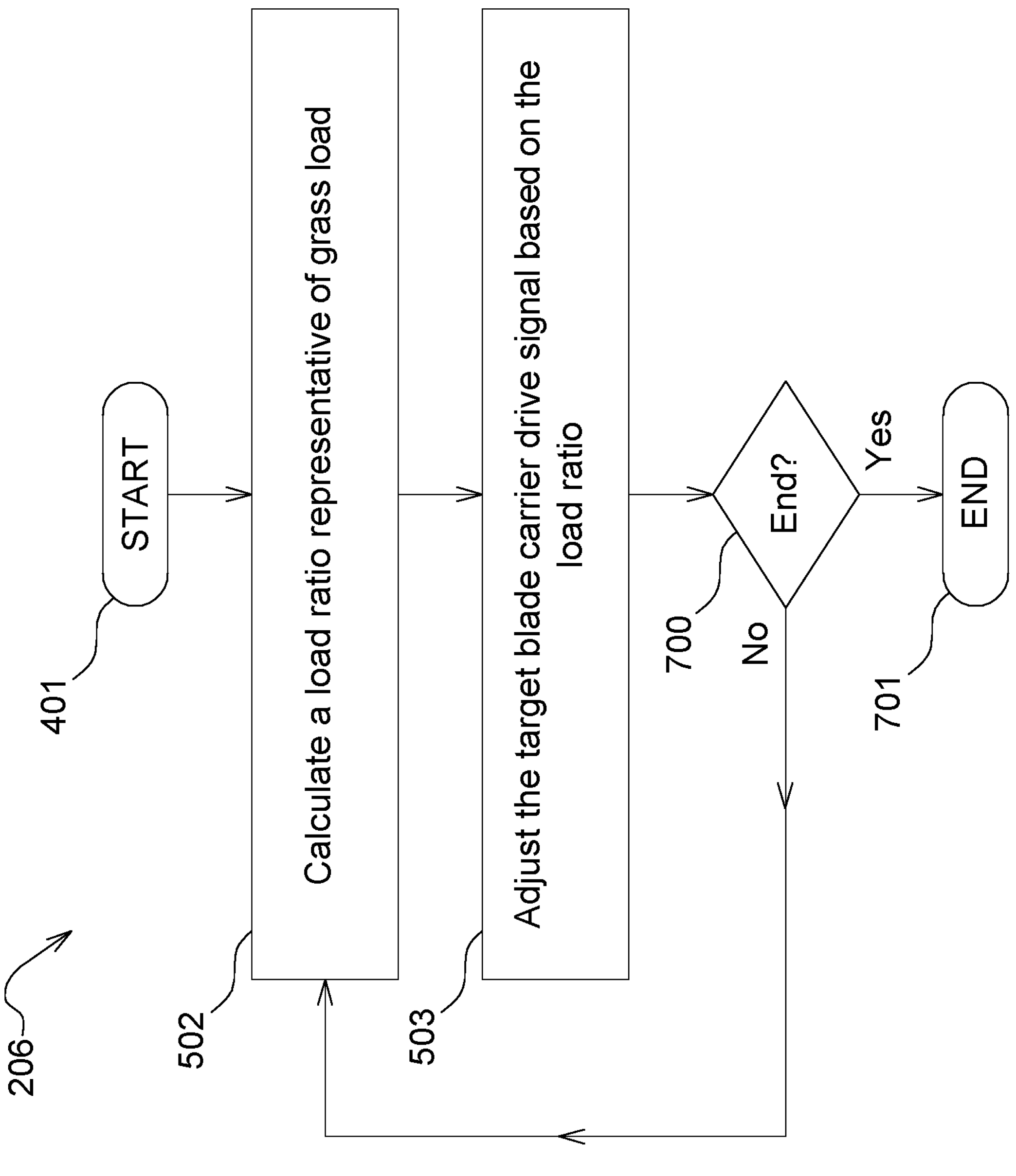
FIG. 6 is a flow chart illustrating cutting speed control logic associated with the mowers of FIGS. 1-3.
Figure 7:
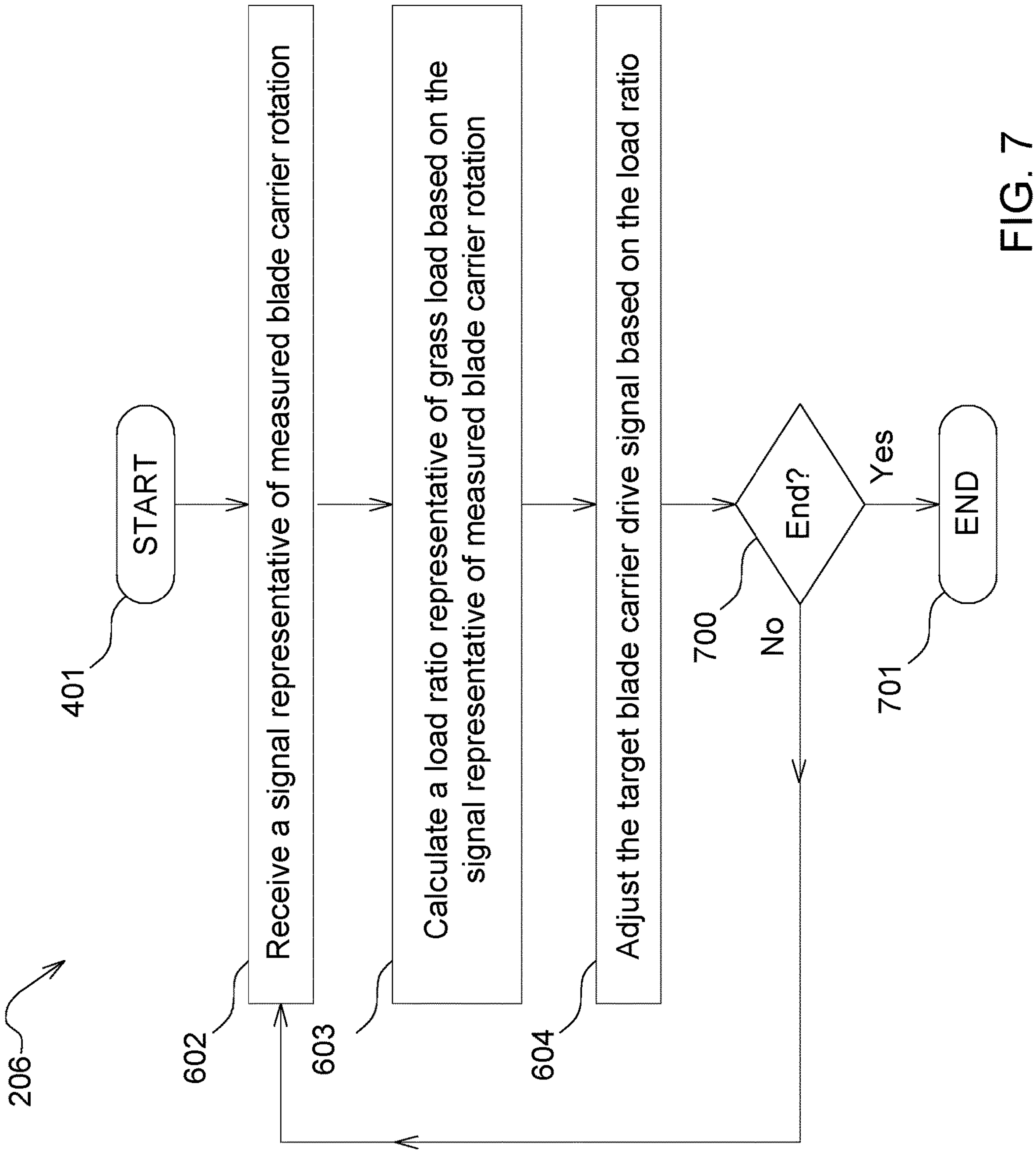
FIG. 7 is a flow chart illustrating cutting speed control logic associated with the mowers of FIGS. 1-3.

FIGS. 5-7 illustrate the cutting speed control logic 206 in flowchart form. Though steps may be described in sequential order herein, the steps may be performed in other suitable orders, some combinations of steps may be performed at the same time, and some steps may be omitted. Additional steps are apparent from the disclosure of the cutting speed control logic 206 above.

FIG. 5 illustrates adjusting the target blade carrier drive signal 224 based on the signal 228 representative of measured blade carrier rotation. At step 401, the cutting speed control logic 206 starts. This may occur at startup of the mower 10, after stabilization of the blade carrier 12 from startup, when the ground speed rises above a threshold, or at any other suitable time. Upon initiation of the cutting speed control, at step 402, the controller 200 receives a signal representative of measured blade carrier rotation. Measured blade carrier rotation may include: measured blade carrier speed, measured blade carrier torque, or a combination thereof. At step 403, the controller 200 adjusts the target blade carrier drive signal 224 based on the signal 228 representative of blade carrier rotation. As long as the program has no reason to end ("NO" at question 700), cutting speed control may continue in a closed loop. Cutting speed control may end ("YES" at question 700) for any predetermined reason. As one example, cutting speed control ends (at step 701) when the mower 10 is turned off. In this example, the question 700 may more specifically be "is mower turned OFF?".

FIG. 6 illustrates adjusting the target blade carrier drive signal 224 based on the load ratio representative of grass load. Step 401 is the same as described above. At step 502, the controller 200 calculates the load ratio representative of grass load. At step 503, the controller 200 adjusts the target blade carrier drive signal 224 based on the load ratio. As long as the program has no reason to end ("NO" at question 700), cutting speed control may continue in a closed loop. Cutting speed control may end ("YES" at question 700) for any predetermined reason as described above (see question 700 and step 701). The load ratio may be based on the measured blade carrier rotation value from step 402, as shown and described with respect to FIG. 7.

FIG. 7 illustrates adjusting the target blade carrier drive signal 224 based on the load ratio representative of grass load, which is based on the signal representative of measured blade carrier rotation. Step 401 is the same as described above. At step 602, the controller 200 receives a signal representative of measured blade carrier rotation. Measured blade carrier rotation may include one or more of: measured blade carrier speed, measured blade carrier torque, or a combination thereof. At step 603, the controller 200 calculates the load ratio representative of grass load based on the signal representative of measured blade carrier rotation. At step 604, the controller 200 adjusts the target blade carrier drive signal based on the load ratio. As long as the program has no reason to end ("NO" at question 700), cutting speed control may continue in a closed loop. Cutting speed control may end ("YES" at question 700) for any predetermined reason as described above (see question 700 and step 701).

Figure 8:
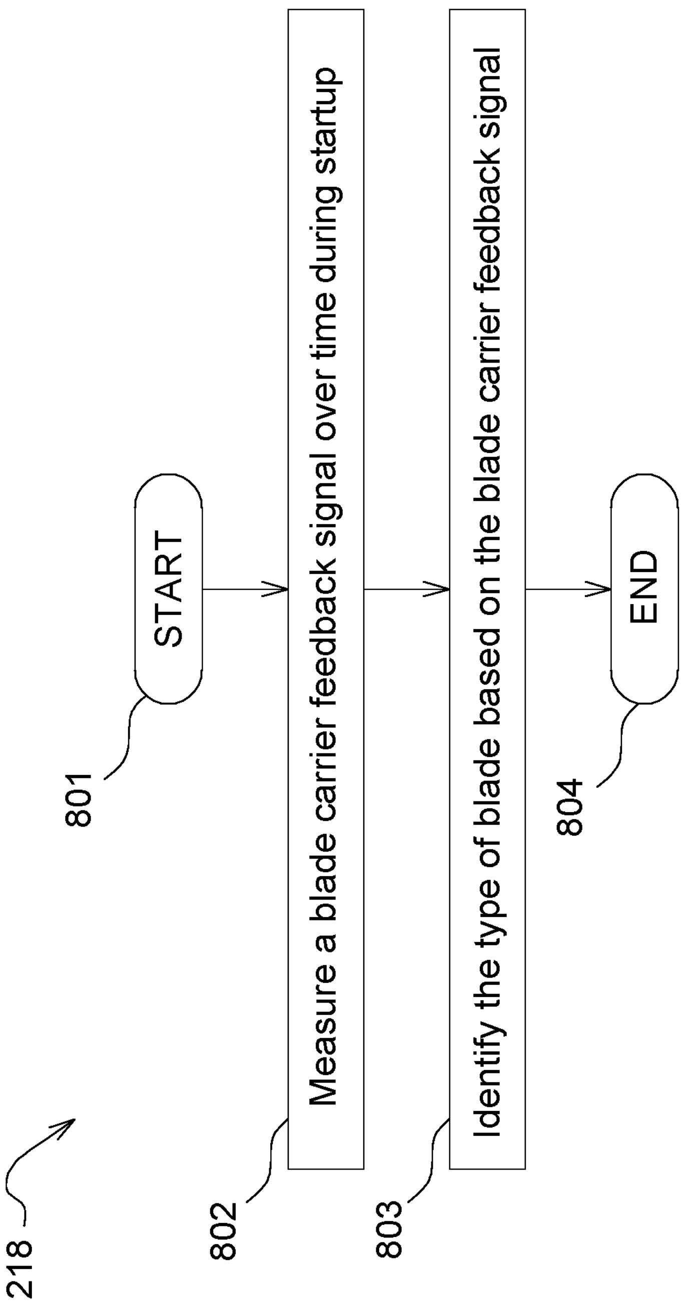
FIG. 8 is a flow chart illustrating blade detection logic associated with the mowers of FIGS. 1-3.

FIG. 8 illustrates the blade detection logic 218 in flowchart form. Though steps may be described in sequential order herein, the steps may be performed in other suitable orders, some combinations of steps may be performed at the same time, and some steps may be omitted. Additional steps are apparent from the disclosure of the blade detection logic 218 above.

At step 801, the blade detection logic 218 starts. As one example, the start may be initiated at startup of the mower 10. As one example, the constant predetermined speed signal 236 may be applied to drive rotation of the electric motor 16 from rest during startup. As another example, the constant predetermined torque signal 238 may be applied to drive rotation of the electric motor 16 from rest during startup. At step 802, a blade carrier feedback signal is measured. As one example, the blade carrier feedback signal is measured over time during startup. Measurement may end after the startup blade carrier feedback signal stabilizes. In other examples, measurement may occur at any point or points in time. At step 803, the type of blade being used on the mower 10 is identified based on the blade carrier feedback signal. After the blade type is identified, blade detection ends at step 804. As is understood from the description of the blade detection logic 218 above, there may be additional steps before ending blade detection or after ending blade detection. The identified blade type may be used to control an operation of the mower 10. For example, the identified blade type may used to influence cutting speed control. The identified blade type information may be used for determining suitable cutting speed control settings. As one example, a suitable one of the target load ratios 230 may be selected based on the identified blade type. Upon selection of the target load ratio 230, the controller 200 may then execute the cutting speed control logic 206 (e.g., as shown in FIGS. 5-7 and described above) using the selected target load ratio 230. It is possible to consider the blade detection logic 218 to be part of the cutting speed control logic 206 (or vice versa). In this example, the blade detection logic portion would run at startup of the mower 10 and determine which target load ratio 230 to use for automatic cutting speed control. The blade detection logic 218 may also have other uses. For example, the blade detection logic 218 may be used to control other operations of the mower 10, such as ground speed control, blade height control, etc.

The mower 10 may include one or more manual cutting speed controls (e.g., as part of the HMI 42) that allow the operator to manually override the automatic speed control. For example, a high speed override and/or a low speed override may be provided. Actuation of the high speed override may send a signal to run the electric motor 16 at a relatively high or highest speed setting, which may be used to improve cut quality. Actuation of the low speed override may send a signal to run the electric motor 16 at a relatively low or lowest speed setting, which may be used to save energy and extend mower run time.

It should be understood that any numbering or lettering used herein to list steps, methods, or processes is used for purposes of separating items in a list and does not imply any particular order to the listed steps, methods, or processes.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may be comprised of any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Thus, the disclosure provides, among other things, a mower with automatic blade carrier speed control. Various features and advantages of the disclosure are set forth in the following claims.

What is claimed is:

1. An automatic rotary cutting speed control system for a mower, the rotary cutting speed control system comprising:

a mower deck including an electric motor configured to drive a rotatable blade carrier supporting at least one blade for cutting grass; and p1 a controller operatively coupled with the electric motor, the controller including a processor, a memory device operatively coupled with the processor, cutting speed control logic, and target load ratio(s) stored in the memory device and being executable by way of the processor to control rotation of the blade carrier by:

(i) receiving a signal representative of a measurement of blade carrier rotation including rotary speed or torque or both, (ii) calculate a load ratio representative of grass load;

(iii) adjusting a target blade carrier drive signal in response to the received signal to automatically adjust the rotary speed and/or torque of the blade carrier to drive the calculated load ratio towards the target load ratio.

2. The automatic rotary cutting speed control system of claim 1, wherein the measurement of blade carrier rotation is derived from the electric motor current, speed, or both.

3. The automatic rotary cutting speed control system of claim 1, wherein the measurement of blade carrier rotation is derived from current, voltage, or both at a battery configured to power the electric motor.

4. The automatic rotary cutting speed control system of claim 1, wherein the target blade carrier drive signal drives a rotary speed of the blade carrier.

5. The automatic rotary cutting speed control system of claim 1, wherein the target blade carrier drive signal drives a torque of the blade carrier.

6. The automatic rotary cutting speed control system of claim 1, wherein the cutting speed control logic stored in the memory device is further executable by the processor to (iii) calculate a load ratio using the measurement of blade carrier rotation.

7. The automatic rotary cutting speed control system of claim 6, wherein the load ratio is based on the measurement of blade carrier rotation and the target blade carrier drive signal.

8. An automatic rotary cutting speed control system for a mower, the automatic cutting speed control system comprising:

a mower deck including an electric motor configured to drive a rotatable blade carrier supporting at least one blade for cutting grass, wherein the motor is drivable by a target blade carrier drive signal; and a controller operatively coupled with the electric motor, the controller including a processor, a memory device operatively coupled with the processor, and cutting speed control logic stored in the memory device and being executable by way of the processor to control rotation of the blade carrier by:

(i) calculating a load ratio representative of grass load, and (ii) send at least one target blade carrier drive signal to the electric motor to automatically adjust the cutting speed in response to the load ratio, to drive the load ratio towards a target load ratio value stored in the memory device.

9. The automatic rotary cutting speed control system of claim 8, wherein the load ratio is continuously calculated, and wherein the target blade carrier drive signal is continuously adjusted.

10. The automatic rotary cutting speed control system of claim 8, wherein the load ratio is calculated based on a measurement representative of blade carrier rotation.

11. The automatic rotary cutting speed control system of claim 10, wherein the load ratio is further calculated based on the target blade carrier drive signal or a measured blade carrier speed.

12. The automatic rotary cutting speed control system of claim 8, wherein the target blade carrier drive signal is set to a nominal value based on a ground speed of the mower.

13. An automatic blade detection system for a mower with electrically driven deck, the automatic blade detection system comprising:

a mower deck including an electric motor configured to drive a rotatable blade carrier supporting at least one first blade for cutting grass, wherein the at least one first blade is interchangeable with at least one second blade for cutting grass, wherein the at least one first blade is a different type of blade than the at least one second blade; and a controller operatively coupled with the electric motor, the controller including a processor, a memory device operatively coupled with the processor, and blade detection logic stored in the memory device and being executable by way of the processor to:

measure a blade carrier feedback signal, identify the type of blade based on the blade carrier feedback signal, send control signals to the electric motor to automatically adjust a cutting speed, wherein the automatic adjustment is in response to the identified type of blade;

calculate a load ratio in real time;

select a target load ratio value based on the type of blade identified; and continuously send control signals to the electric motor to automatically adjust the cutting speed to drive the load ratio towards the target load ratio value.

14. The automatic blade detection system of claim 13, wherein the blade carrier feedback signal is measured and recorded during startup at least until the blade carrier stabilizes.

15. The automatic blade detection system of claim 13, wherein the different types of blades are characterized by one or more of: a different blade length, a different blade lift, a different blade mass, or any combination thereof.

16. The automatic blade detection system of claim 13, wherein the memory device includes a plurality of blade type categories stored therein, and wherein identifying includes sorting the blade carrier feedback signal into one of the plurality of blade type categories.

17. The automatic blade detection system of claim 13, wherein the blade carrier feedback signal includes blade carrier torque, and wherein the blade detection logic is further executable by the processor to:

apply a constant predetermined speed to the blade carrier at each startup, and use the measured blade carrier torque during startup to identify the type of blade.

18. The automatic blade detection system of claim 13, wherein the blade carrier feedback signal includes blade carrier speed, and wherein the blade detection logic is further executable by the processor to:

apply a constant predetermined torque to the blade carrier at each startup, and use the measured blade carrier speed during startup to identify the type of blade.

* * * * *